United States Patent [19]
Takizawa

[11] Patent Number: 6,034,849
[45] Date of Patent: Mar. 7, 2000

[54] THIN FILM MAGNETIC HEAD AND METHOD OF MANUFACTURING THE SAME

[75] Inventor: Masaharu Takizawa, Tokyo, Japan

[73] Assignee: NEC Corporation, Tokyo, Japan

[21] Appl. No.: 08/912,366

[22] Filed: Aug. 18, 1997

[30] Foreign Application Priority Data

Aug. 22, 1996 [JP] Japan ..................................... 8-221130

[51] Int. Cl.$^7$ ................................ G11B 5/10; G11B 5/41
[52] U.S. Cl. ........................................................... 360/128
[58] Field of Search .................................... 360/128, 125, 360/137

[56] References Cited

U.S. PATENT DOCUMENTS

| | | | |
|---|---|---|---|
| 4,383,217 | 5/1983 | Shiell | 324/158 |
| 5,670,888 | 9/1997 | Cheng | 324/754 |

FOREIGN PATENT DOCUMENTS 58-57613  4/1983  Japan .

*Primary Examiner*—George J. Letscher
*Attorney, Agent, or Firm*—Sughrue, Mion, Zinn, Macpeak & Seas, PLLC

[57] ABSTRACT

A thin film magnetic head includes a thin film magnetic head element, a reference resistor, and a four point probe reference resistor. The thin film magnetic head element is formed on a substrate having a medium-opposing surface. The reference resistor is formed on the substrate near the thin film magnetic head element, and electrically detects a polishing amount of the medium-opposing surface. The four point probe reference resistor is formed on the substrate near the thin film magnetic head element, and corrects the polishing amount of the medium-opposing surface which is detected by the reference resistor. A method of forming the thin film magnetic head is also disclosed.

6 Claims, 4 Drawing Sheets

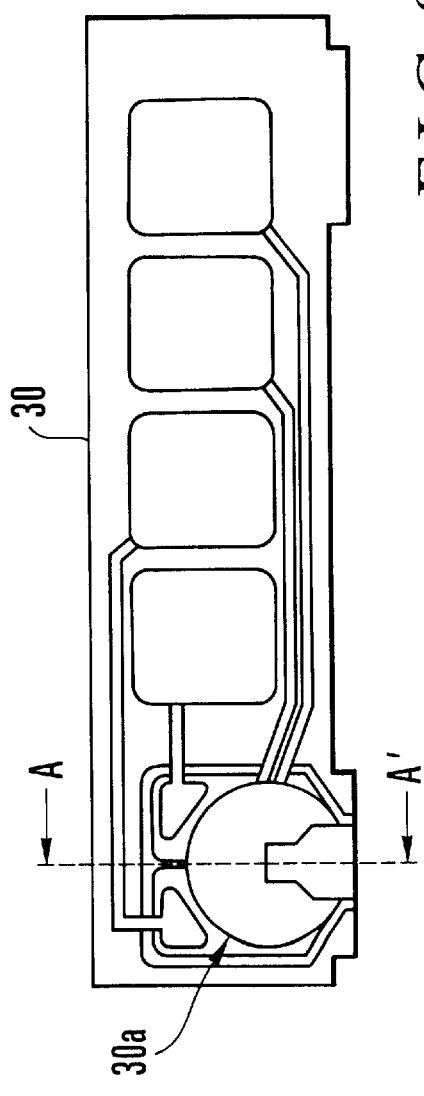
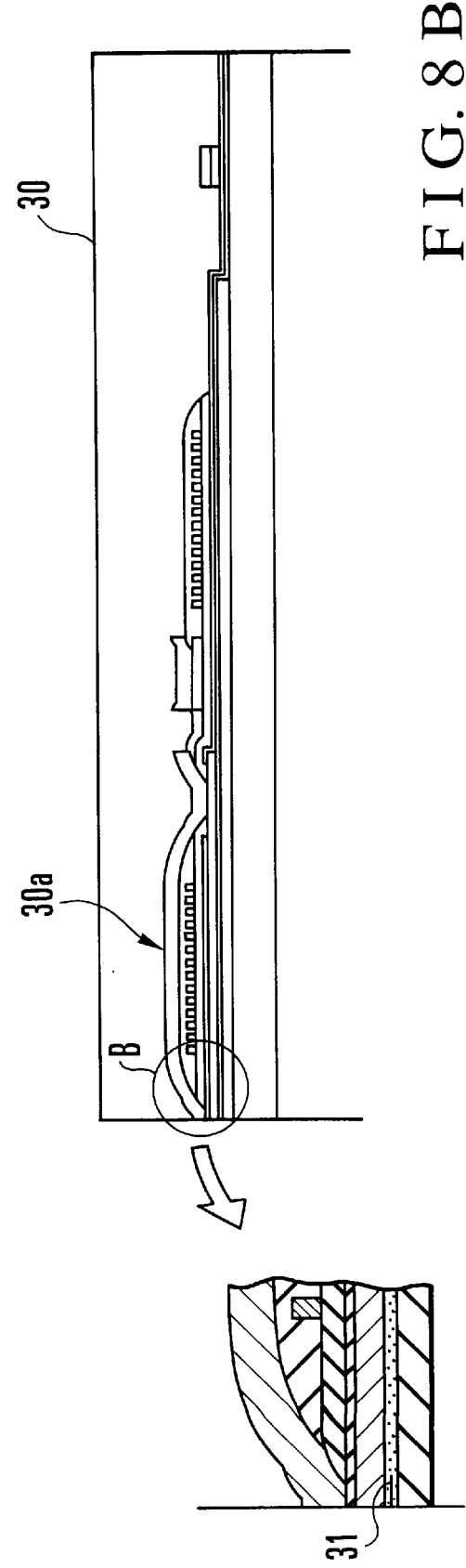
FIG. 8A
FIG. 8B

THIN FILM MAGNETIC HEAD AND METHOD OF MANUFACTURING THE SAME

BACKGROUND OF THE INVENTION

The present invention relates to a thin film magnetic head for detecting a magnetic signal recorded on a medium and, more particularly, to a thin film magnetic head having a mechanism for improving the precision of finish polishing of the medium-opposing surface and a manufacturing method of the same.

In general, as shown in FIG. 3, a thin film magnetic head 9 is formed with an electric lap monitor 10 as an end point detection means used when finish-polishing its medium-opposing surface 12. According to the general operation of the electric lap monitor 10, as shown in FIG. 4, during finish polishing of the medium-opposing surface 12, as polishing progresses, a pattern width h4 of a resistor 15 formed to be parallel to the medium-opposing surface 12 decreases gradually. Along with this decrease, the resistance detected between terminals 16a and 16b of the electric lap monitor 10 increases. When this resistance reaches a desired value, it is determined that the polishing end point has been reached.

When the resistance as the target of the polishing end point is fixed, variations in film thickness and resistivity of the resistor 15 cause variations in polishing end point. In a thin film magnetic head used in a magnetic disk device, even the most popular product requires a submicron-order precision in the polishing amount of its medium-opposing surface. For this reason, it is inappropriate to fix the resistance which is the target of the polishing end point.

In order to solve this problem, usually, a two terminal reference resistance 11 always showing a constant resistance is prepared separately from the electric lap monitor 10, as shown in FIG. 3, regardless of the progress of polishing or bar-like cutting as a pre-step in polishing.

FIG. 7 schematically shows the two terminal reference resistance 11. A resistor 27 of the two terminal reference resistance 11 is formed in accordance with the same process and material as those of the resistor 15 of the electric lap monitor 10 shown in FIG. 4. As shown in FIG. 3, if the distance between the resistor 27 and the resistor 15 is not very large, the resistivity and film thickness of the resistor 27 of the two terminal reference resistance 11 and those of the resistor 15 of the electric lap monitor 10 can be regarded as equal. Accordingly, the resistance of the resistor 27 of the two terminal reference resistance 11 is measured between terminals 28a and 28b, and the resistance as the target of the polishing end point can be calculated with reference to the measured resistance.

An example of the polishing method for the medium-opposing surface utilizing the electric lap monitor as described above is disclosed in, e.g., Japanese Patent Laid-Open No. 58-57613. More specifically, this reference describes a method of forming the electric lap monitor of a thin film magnetic head and that of a magnetoresistive effect type head in the same process of forming one of the constituent elements of the magnetic head, and the polishing amount of the medium-opposing surface is detected by using both the electric lap monitor and the reference resistance.

In the case of a thin film magnetic head, in a thin film magnetic head 30 shown in FIGS. 8A to 8B, the resistors of the electric lap monitor and the reference resistance are most generally formed in the same process of forming a magnetoresistive effect element film 31 made of a stacked film of an NiFe alloy or the like which is one of the constituent elements of a thin film magnetic head element 30a.

In the thin film magnetic head using the conventional two terminal reference resistance 11 shown in FIG. 7, when widths h3 and w3 of the resistor 27 of the two terminal reference resistance 11 vary, the resistance of the resistor 27 which is used for calculating the reference for the polishing end point of the medium-opposing surface 29 also varies.

In general, due to the limitation in the manufacture, it is difficult to suppress the variations in width of the resistor 27 within a range that does not influence the polishing precision, and the variations in width of the resistor 27 still directly appear as the variations in polishing end point.

SUMMARY OF THE INVENTION

It is an object of the present invention to provide a thin film magnetic head in which the precision in the polishing position of the medium-opposing end face is improved regardless of variations in pattern width of the resistor of the reference resistance used in the thin film magnetic head, and a method of manufacturing the same.

In order to achieve the above object, according to the present invention, there is provided a thin film magnetic head comprising a thin film magnetic head element formed on a substrate having a medium-opposing surface, a monitor resistor formed on the substrate near the thin film magnetic head element to electrically detect a polishing amount of the medium-opposing surface, and a four point probe reference resistor formed on the substrate near the thin film magnetic head element to correct the polishing amount of the medium-opposing surface which is detected by the monitor resistor.

BRIEF DESCRIPTION OF THE DRAWINGS

FIG. 8A is a plan view of a general thin film magnetic head, FIG. 8B is a sectional view taken along the line A-A' of FIG. 8A, including an enlarged view of a portion B.

DESCRIPTION OF THE PREFERRED EMBODIMENTS

The present invention will be described in detail with reference to the accompanying drawings.

Figure 1:
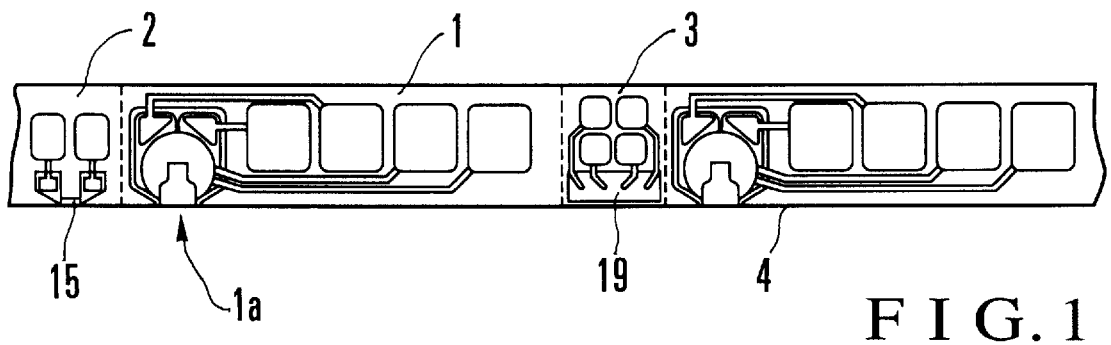
FIG. 1 is a plan view of a thin film magnetic head according to the first embodiment of the present invention during the manufacture.
Figure 4:
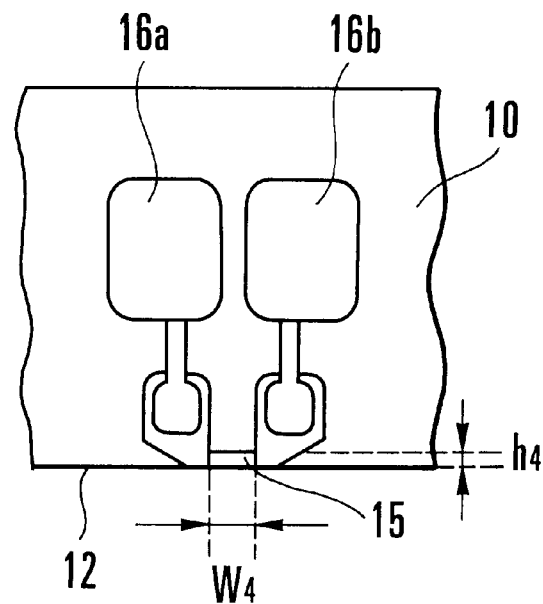
FIG. 4 is a plan view showing the structure of an electric lap monitor.

FIG. 1 shows a thin film magnetic head according to the first embodiment of the present invention during the manufacture. Referring to FIG. 1, a thin film magnetic head element 1a constituting a thin film magnetic head 1 is formed on a substrate, and an electric lap monitor 2 and a four point probe reference resistance 3 are alternately formed on the chip cut surface of the thin film magnetic head element 1a. The structure of the electric lap monitor 2 is identical to that shown in FIG. 4, and a detailed description thereof will be omitted.

The four point probe method is the most general method of measuring the resistivity of a semiconductor sample and is devised by Valdes. According to this method, one surface of a sample is set flat, and four probes are brought into contact with one straight line on the flat surface. When all the gaps among the probes are equal, the resistivity of the sample is obtained from equation (1) to be described later based on the voltage applied across the two inner probes, the current flowing through the two outer probes, and the like. In the four point probe reference resistance 3, the four probes described above are formed on the resistor serving as the sample in accordance with the thin film technique.

Figure 5:
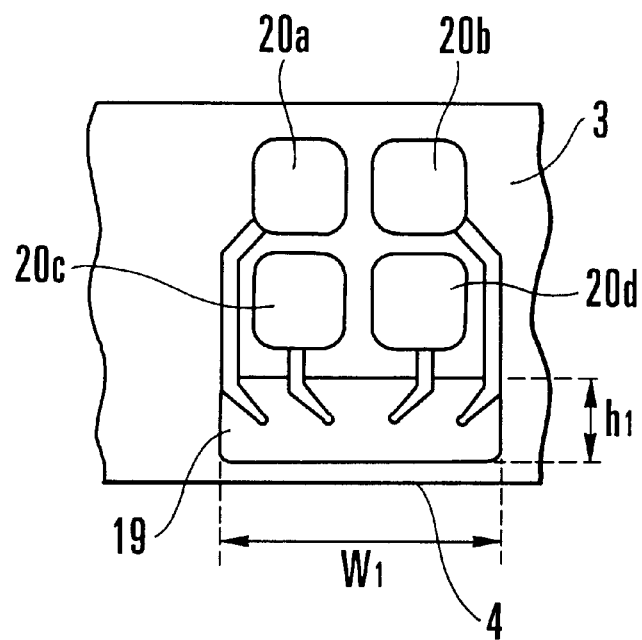
FIG. 5 is a plan view showing the structure of a four point probe reference resistance shown in FIG. 1.

FIG. 5 shows the structure of the four point probe reference resistance 3 shown in FIG. 1. Referring to FIG. 5, a rectangular resistor 19 and four terminals 20a to 20d are formed on the substrate. The longitudinal direction of the resistor 19 is set along a medium-opposing surface 4. Four probes lead from the terminals 20a to 20d come into point contact with the surface of the resistor 19 equidistantly to be parallel to the medium-opposing surface 4.

In the thin film magnetic head 1 having the above arrangement, when a current I is supplied across the terminals 20a and 20b of the reference resistance 3, assuming that the voltage across the terminals 20c and 20d is defined as E, a resistivity ρ1 of the resistor 19 is expressed by equation (1):

$$\rho 1 = \frac{2\pi s E}{I} F d \qquad (1)$$

where s is the distance among the respective probes, d is the film thickness of the resistor 19, F is the specific constant (0.72 in the case of the CGS system of units) resulting from the principle of the four point probe method, and π is the circle ratio.

Equation (1) includes two unknowns, i.e., the resistivity ρ1 and the film thickness d of the resistor 19 of the reference resistance 3. If the reference resistance 3 and the electric lap monitor 2 are arranged at such a distance from each other that these values can be regarded to be equal to the resistivity and film thickness of the resistor 15 of the electric lap monitor 2, the practical values of ρ1 and d need not be obtained when calculating the resistance at the polishing end point.

What is required here is the ratio ρ1/d (to be referred to as the reference value hereinafter) of the resistivity to the film thickness. Equation (1) can be rewritten as follows:

$$\frac{\rho 1}{d} = \frac{2\pi s E}{I} F \qquad (2)$$

The left-hand side ρ1/d of equation (2) is the reference value that should be obtained from the reference resistance 3.

If the pattern widths of the resistor 15 of the electric lap monitor 2 obtained when the medium-opposing surface 4 is polished to the desired position are h4 and w4, a resistance R1 between the terminals 16a and 16b at this time can be obtained from the following equation by using the reference value ρ1/d obtained in advance:

$$R1 = \frac{\rho 1}{d} \cdot \frac{w4}{h4} \qquad (3)$$

Therefore, if polishing is ended when the resistance between the terminals 16a and 16b of the electric lap monitor 2 reaches R1 obtained in accordance with equation (3), the medium-opposing surface 4 can be finished at the desired position.

As is apparent from the right-hand side of equation (2), the reference value ρ1/d obtained from the four point probe reference resistance 3 does not depend on pattern widths h1 and w1 of the resistor 19. This signifies that even if the pattern widths h1 and w1 of the resistor 19 vary, the reference value obtained from the reference resistance 3 does not vary. Accordingly, the reference of the resistor 19 as the target of the polishing end point can be obtained accurately, so that the polishing precision of the medium-opposing surface 4 can be improved.

Figure 2:
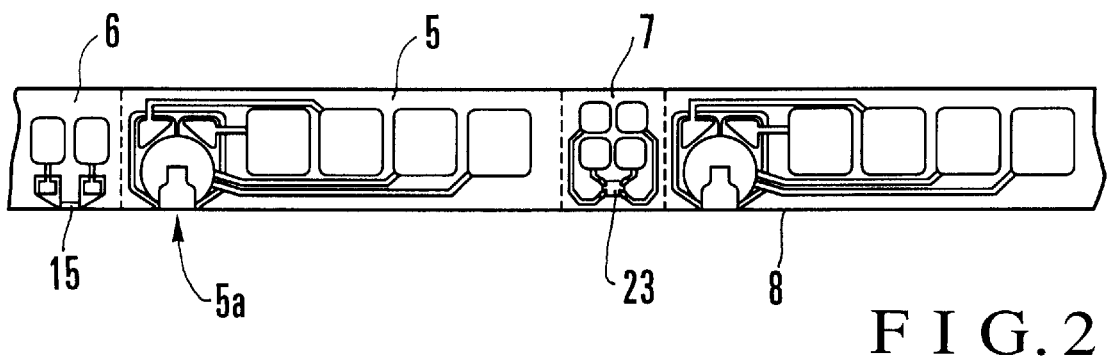
FIG. 2 is a plan view of a thin film magnetic head according to the second embodiment of the present invention during the manufacture.
Figure 3:
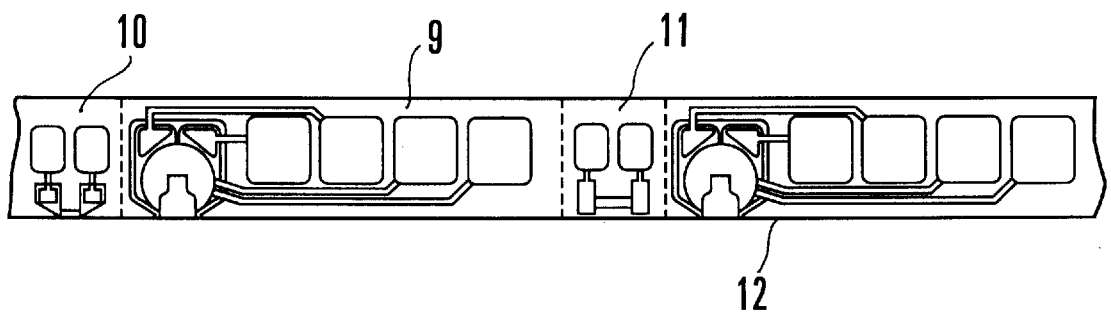
FIG. 3 is a plan view of a conventional thin film magnetic head during the manufacture.

FIG. 2 shows a thin film magnetic head according to the second embodiment of the present invention during the manufacture. A thin film magnetic head 5 (FIG. 2) having a thin film magnetic head film 5a has a Van der Pauw reference resistance 7 in place of the four point probe reference resistance 3. Except this, the arrangement of FIG. 2 is the same as that of FIG. 1, and a detailed description thereof will be omitted.

The Van der Pauw method is a measuring method with which the Hall coefficient and resistivity of a sample having a constant thickness and uniform arbitrary shape can be obtained. This method is proposed by Van der Pauw and currently utilized in the evaluation of a crystal and the like. According to this method, the probes are brought into contact with arbitrary four points on the circumference of the sample. The resistivity and Hall coefficient of the sample are obtained based on the ratio of the current flowing between the two adjacent probes to the voltage obtained between the two remaining probes in accordance with following equation (4).

Figure 6:
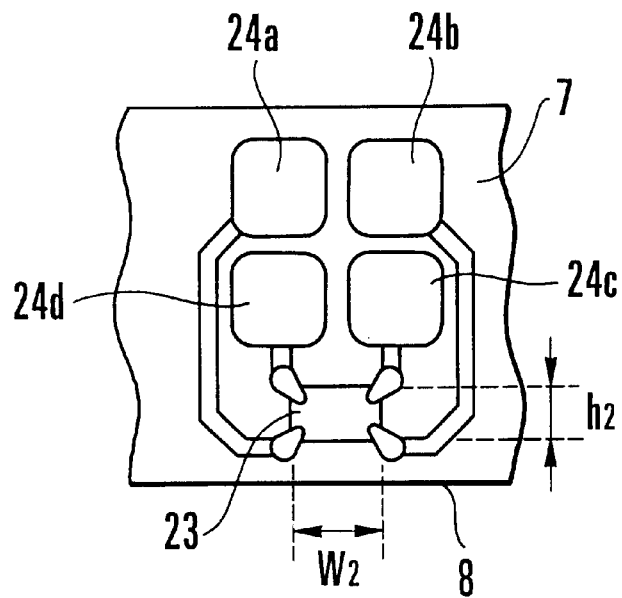
FIG. 6 is a plan view showing the structure of a Van der Pauw reference resistance shown in FIG. 2.
Figure 7:
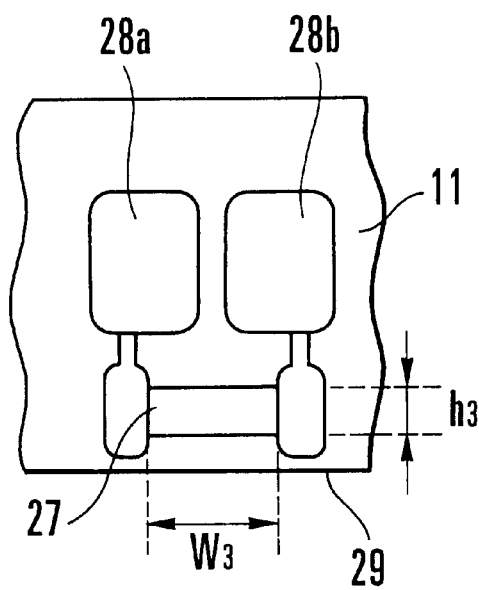
FIG. 7 is a plan view showing the structure of a conventional reference resistance shown in FIG. 3.

The Van der Pauw reference resistance 7 of this embodiment has, as shown in FIG. 6, a rectangular resistor 23 formed on a substrate, and four terminals 24a to 24d connected to four probes that come into point contact with the four corners of the resistor 23. In the Van der Pauw reference resistance 7, the reference value does not depend on pattern widths h2 and w2 of the resistor 23, in the same manner as in the first embodiment. Hence, the reference of the resistance as the target of the polishing end point can be obtained accurately.

The reason for this will be described. Equation (4) is obtained as follows:

$$\exp\left(-\pi E a b, c d \frac{d}{\rho 2}\right) + \exp\left(-\pi E b c, d a \frac{d}{\rho 2}\right) = 1 \qquad (4)$$

where ρ2 is the resistivity and d is the film thickness, respectively, of the resistor 23 of the reference resistance 7, and π is the circle ratio.

Note that Eab,cd represents the potential difference between the terminals 24d and 24c obtained when a unit current is flowed from the terminal 24a to the terminal 24b, and that Ebc,da represents the potential difference between the terminals 24a and 24d obtained when a unit current is flowed from the terminal 24b to the terminal 24c.

When numerical calculation is performed by a computer by using equation (4), the reference value ρ2/d that should be obtained from the reference resistance 7 can be calculated easily. Therefore, the resistance at the polishing end point of an electric lap monitor 6 can be calculated in the same manner.

As is also apparent from equation (4), the reference value $\rho 2/d$ does not depend on the pattern widths h2 and w2 of the resistor 23. Even if the widths h2 and w2 of the resistor 23 vary, the reference value obtained from the reference resistance 7 does not vary, and the reference of the resistance as the target of the polishing end point can be obtained accurately. As a result, the polishing precision of the medium-opposing surface 8 of the thin film magnetic head 5 can be improved.

In any of the embodiments described above, the electric lap monitor and the reference resistance are arranged alternately through the thin film magnetic head. However, the present invention is not limited to this arrangement. Although the electric lap monitor and reference resistance of any embodiment are arranged on the cut surface between the respective thin film magnetic head chips, they may be arranged in the thin film magnetic head chips.

As has been described above, in the thin film magnetic head according to the present invention, a four point probe or Van der Pauw resistance is used as a reference resistance used for correcting the variations in film thickness and resistivity of the electric lap monitor. Even if the pattern width of the resistor varies, the reference of the resistance as the target of the polishing end point can be obtained accurately, and the precision of the polishing position of the medium-opposing surface can be improved.

What is claimed is:

1. A thin film magnetic head comprising:
   a thin film magnetic head element formed on a substrate having a medium-opposing surface;
   a monitor resistor formed on said substrate near said thin film magnetic head element to electrically detect a polishing amount of said medium-opposing surface; and
   a four point probe reference resistor formed on said substrate near said thin film magnetic head element to correct the polishing amount of said medium-opposing surface which is detected by said monitor resistor, regardless of a variation in a pattern width of said reference resistor.

2. A magnetic head according to claim 1, wherein a resistance is obtained from a ratio of a resistivity to a film thickness of said reference resistor and a pattern width of said reference resistor, and
   a polishing operation of said medium-opposing surface is controlled based on a resistance of said monitor resistor and the obtained resistance.

3. A magnetic head according to claim 1, wherein said four point probe reference resistor has four probes that come into contact with one straight line, parallel to said medium-opposing surface, to be equidistant from each other.

4. A magnetic head according to claim 3, wherein:
   a resistance is obtained from a ratio of a resistivity to a film thickness of said reference resistor and a pattern width of said reference resistor, and
   a polishing operation of said medium-opposing surface is controlled based on a resistance of said monitor resistor and the obtained resistance.

5. A thin film magnetic head comprising:
   a thin film magnetic head element formed on a substrate having a medium-opposing surface;
   a monitor resistor formed on said substrate near said thin film magnetic head element to electrically detect a polishing amount of said medium-opposing surface; and
   a four point probe reference resistor formed on said substrate near said thin film magnetic head element to correct the polishing amount of said medium-opposing surface which is detected by said monitor resistor wherein said four point probe reference resistor comprises a Van der Pauw resistor which has four probes that come into point contact with arbitrary four points on a circumference.

6. A magnetic head according to claim 5, wherein:
   a resistance is obtained from a ratio of a resistivity to a film thickness of said reference resistor and a pattern width of said reference resistor, and
   a polishing operation of said medium-opposing surface is controlled based on a resistance of said monitor resistor and the obtained resistance.

* * * * *